W. Rickard,
Floating Dock.
No. 105,725. Patented July 26, 1870.
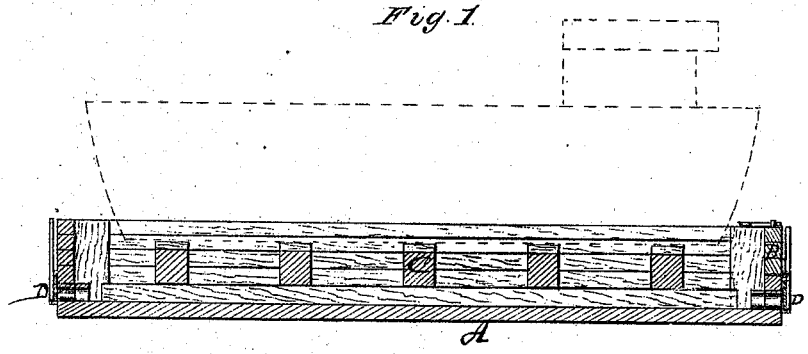
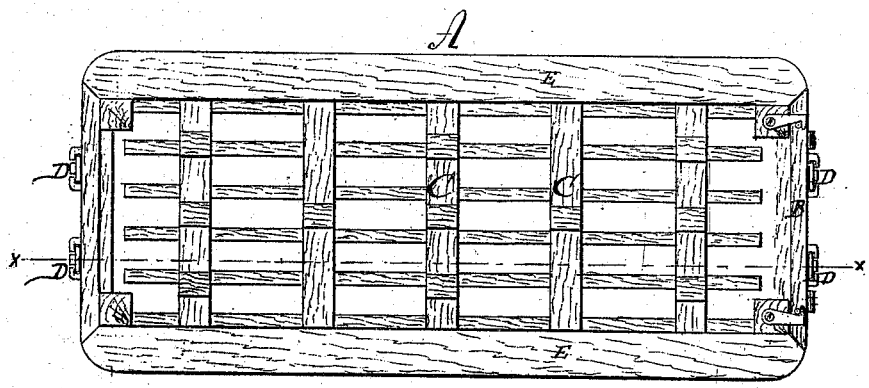
Witnesses:
L. S. Mabee
Alex. F. Roberts
Inventor:
W. Rickard
per Munn & Co.
Attorneys.

United States Patent Office.

WILLIAM RICKARD, OF JERSEY CITY, NEW JERSEY, ASSIGNOR TO HIMSELF AND E. K. MEIGS, OF SAME PLACE.

Letters Patent No. 105,725, dated July 26, 1870.

IMPROVEMENT IN FLOATING TIDE-DOCKS.

The Schedule referred to in these Letters Patent and making part of the same

*To all whom it may concern:*

Be it known that I, WILLIAM RICKARD, of Jersey City, county of Hudson, and State of New Jersey, have invented a new and useful Improvement in Floating Tide-Dock; and I do hereby declare that the following is a full, clear, and exact description thereof, which will enable others skilled in the art to make and use the same, reference being had to the accompanying drawing forming part of this specification.

This invention relates to a new and useful improvement in docks for repairing and building canal-boats, and other marine vessels, more especially designed for repairing canal-boats; and It consists in a water-tight float with a gate-way for the entrance of the boat or vessel, which gate-way is tightly and securely closed when the boat is placed in the dock or float, and in water-gates (one or more) for the discharge of the water, as will be hereinafter more fully described.

In the accompanying drawing—

Figure 1 is a longitudinal vertical section on the line $x \, x$ of fig. 2.

Figure 2 is a top or plan view.

Similar letters of reference indicate corresponding parts.

A is the dock, which is a water-tight vessel of length and width suitable to receive canal or other boats or vessels, with one or both of its ends hinged so as to be turned down for the admission of the boat or vessel. When the canal-boat has been floated into the dock the hinged end is fastened up and secured by hooks, or otherwise, as seen in fig. 2.

B represents this hinged end.

C are the bottom timbers of the dock upon which the boat or vessel is supported.

The outline of a boat is seen in dotted lines resting on the bottom of the dock.

D represents the gates through which the water is allowed to escape after the tide has raised the dock and boat. These gates are simple slides confined in grooves worked against the ends or end of the dock water-tight.

This dock operates entirely with the tide. There is, consequently, no pumping or expense for steam or other power for that purpose. When the tide is down the dock rests upon the bottom. When the tide rises the end of the dock is dropped down and a boat or vessel is floated into it. The hinged end B is then raised and fastened up, as seen. When the tide again falls the gates are opened, and the water runs out through the gates, which are again closed. It will be seen that the dock, with the boat, floats at high water, and rests on the bottom or in the mud at low water, the bottom of the boat being all the time high and dry for caulking or other repairs.

E is a broad plank or track around or on the sides of the dock. As the top of the dock is always above water, this track allows operations to be commenced on the boat as soon as she is docked, and before the tide falls to let out the water.

These docks are portable, and may be used in any location along shore where the tide rises and falls sufficiently to float and empty them.

Having thus described my invention,

I claim as new and desire to secure by Letters Patent—

The water-tight floating dock A, for canal-boats, having hinged end B, and water-escape gates D, each constructed and relatively arranged as described.

The above specification of my invention signed by me this 23d day of March, 1870.

WILLIAM RICKARD.

Witnesses:
GEO. W. MABEE,
ALEX. F. ROBRETS.